Oct. 8, 1935.    J. R. SKOVERSKI    2,016,655
TOASTER
Original Filed Jan. 20, 1931    3 Sheets-Sheet 1

INVENTOR.
JOHN R. SKOVERSKI
BY Charles S. Evans
HIS ATTORNEY

Oct. 8, 1935.   J. R. SKOVERSKI   2,016,655
TOASTER
Original Filed Jan. 20, 1931   3 Sheets-Sheet 2

INVENTOR.
JOHN R. SKOVERSKI
BY Charles A. Evans
HIS ATTORNEY

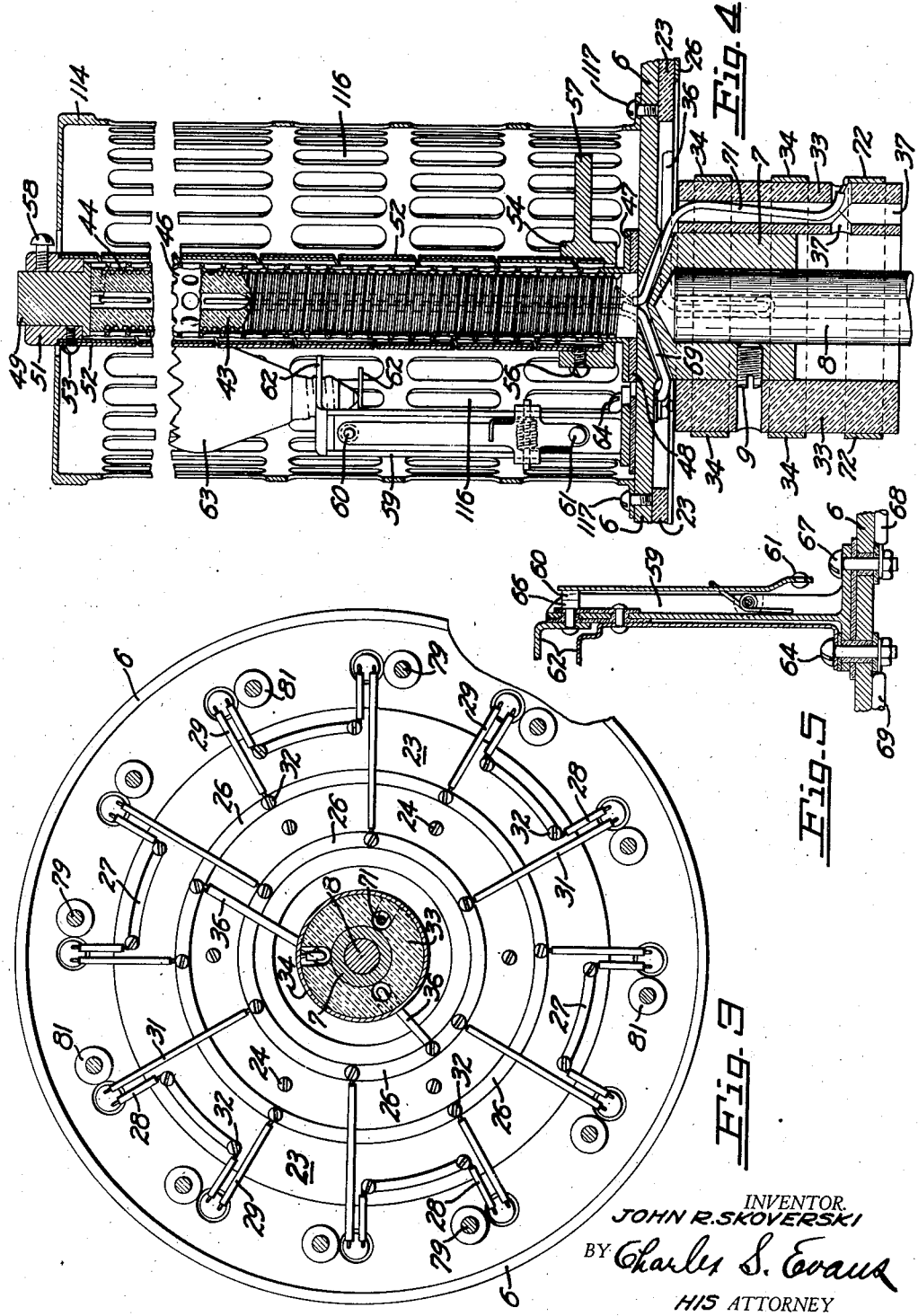

Patented Oct. 8, 1935

2,016,655

UNITED STATES PATENT OFFICE 2,016,655

TOASTER

John R. Skoverski, Berkeley, Calif., assignor, by mesne assignments, to Margaret Roberts, San Francisco, Calif.

Application January 20, 1931, Serial No. 509,990
Renewed July 29, 1935

4 Claims. (Cl. 219—19)

My invention relates to a toaster, and particularly to a mechanism for toasting recessed objects such as hollow buns.

It is among the objects of my invention to provide a toaster with which a plurality of objects may be toasted at the same time, and in which the replacing of a toasted object with one to be toasted does not interfere with the remaining objects being toasted.

Another object of my invention is to provide a toasting mechanism in which a toasted object is automatically removed from a heating element.

Further objects of my invention include the provision, in a toasting mechanism of the character described, of means for maintaining the heating elements at a substantially constant temperature, and of means whereby the objects to be toasted are left on the heating elements for a predetermined period of time, said means co-operating to properly toast the objects prior to their removal from the heating elements.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 3 is a horizontal sectional view of the toaster, taken in a plane indicated by the line 3—3 of Figure 1.

Figure 4 is a detail vertical sectional view showing the temperature control, taken in a plane indicated by the line 4—4 of Figure 2.

Figure 5 is a fragmentary vertical sectional view taken thru the mid portions of the indicating light bracket and contactor.

Figure 6 is a diagrammatic view showing the electrical hook-up.

Figure 1:
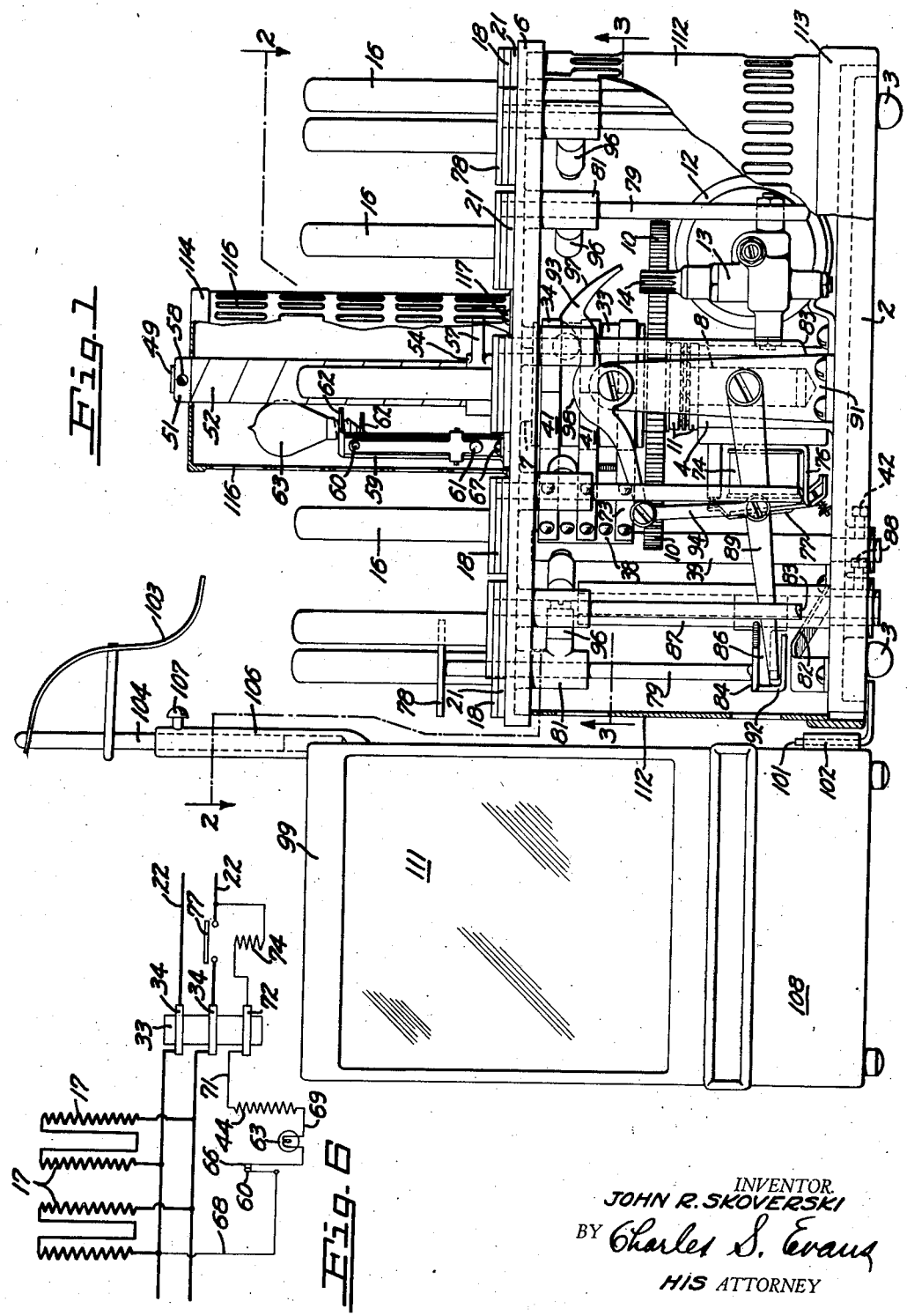
Figure 1 is a side elevational view of the toaster embodying my invention; portions of the view being broken away to disclose the construction more clearly.

In terms of broad inclusion, the toaster embodying my invention comprises a support for holding the object to be toasted, and means for heating the object on the support. In the preferred form of my invention the support includes an elongated heating element adapted to extend into the recess of a hollow bun or other recessed object to be toasted. Means are provided for removing the object from the support. This removing means preferably includes a stripper moving means preferably includes a stripper movable relative to the heating element for displacing the object.

Preferably, a plurality of supports are provided for holding a group of the objects at one time, and means are preferably provided for moving the supports in a predetermined path. Also, a receiver is preferably arranged adjacent the path, and means are provided for periodically actuating the object removing means to strip the toasted objects from their supports and discharge them into the receiver as the supports move in succession past the receiver.

Means are also provided for maintaining the heating means at a substantially constant temperature, and means are preferably provided whereby the object supports are moved in their predetermined path at a constant rate; the temperature control means and support moving means cooperating to properly toast the objects while they are being carried about the predetermined path and prior to their removal from the supports.

In greater detail, the toaster embodying my invention comprises a preferably circular base 2 having suitable legs 3 for resting on a table, counter or other convenient support. A hub 4, preferably cast as an integral part of the base 2, is provided and extends upwardly from the central portions of the base. A turntable 6, also preferably circular, is positioned above and concentric with the base 2, and is provided with a recessed boss 7 extending downwardly from the central portions of the table. The journal mounting for the turntable 6 is provided by a shaft 8, the upper end of which is secured in the recessed boss 7 of the table by a set screw 9, and the lower end of which is journaled in the hub 4 of the base.

Means are provided for rotating the table 6 at a preferably constant rate. A spur gear 10 is secured on the shaft 8 intermediate the base hub 4 and table boss 7, and a suitable thrust bearing 11 is interposed between this gear and the base hub 4; the thrust bearing 11 being preferably a roller bearing to reduce the friction of the turntable mounting. The turntable 6 is preferably driven by a motor 12, mounted on the base 2, thru a suitable reduction gearing 13 and a pinion 14 meshing with the gear 10 of the turntable mounting. The reduction in the drive from the motor to the turntable is designed to rotate the table at a relatively slow speed.

A plurality of supports 16 for holding the objects to be toasted are preferably provided, and are mounted on the turntable 6. Any number of these supports may be provided; twelve being shown for the purposes of illustration. In the preferred form of my invention, as described, the toaster is used for toasting recessed objects, such as hollow buns. For this reason the supports 16 are elongated to extend into a bun recess, and may be cylindrical or any other desirable shape.

In order to heat the buns while on the supports 16, suitable heating means are provided. Preferably, the supports 16 are of suitable conducting material, such as metal, recessed to receive a suitable electrical resistance unit 17. It is thus seen that the bun supports are heating elements, similar in construction to the ordinary immersion type of electrical heating element. The supports or heating elements 16 are arranged in upright position and are spaced about the turntable 6 adjacent its periphery. A base flange 18 is provided on each heating element, and the screws 19 serve to secure the elements to the table 6; a heat insulating washer 21 of asbestos or other suitable material being preferably interposed between the flange 18 and table 6.

As best illustrated in Figure 6, the resistance units 17 of the supports or heating elements 16 are preferably connected in pairs across the 110-volt lines 22. This arrangement is employed to introduce the proper resistance in a given shunt circuit. In Figure 3 is shown the preferred method of connecting the units. An annular plate 23 of suitable electrical insulating material, such as bakelite, is concentrically arranged on the under surface of the table 6, and is held by suitable screws 24.

A pair of ring-shaped bus-bars 26 are concentrically arranged on the plate 23, and are secured by any suitable means. Also, a series of connectors 27 are secured on the plate 23, between alternate pairs of the heating elements 16. One of the leads 28 of each heating unit is connected to an end of a connector 27. Another lead 29 of one of the units in a pair is connected to one of the bus-bars 26, while the remaining lead 31 of the other unit in a pair is connected to the other bus-bar. Suitable screws 32 bind the various leads to the connectors 27 and bus-bars 26, and these screws may conveniently also serve to secure the connectors and bus-bars to the insulating plate 23.

Means are provided for feeding current from the supply lines 22 to the bus-bars 26. For this purpose an insulating sleeve 33 is mounted on the table boss 7, and is preferably held by the set screw 9 which serves to secure the shaft 8 in the boss. This construction is best illustrated in Figure 4. A pair of collector rings 34 are suitably secured to the peripheral surface of the sleeve 33, and the leads 36 are provided connecting each ring to one of the bus-bars 26. By drilling two intersecting holes 37 thru the sleeve a passage is provided for the leads.

An insulating brush base 38 is mounted on a support 39 projecting from the base 2, and carries a pair of brushes 41 adapted to bear against the collector rings 34. The supply lines 22 are connected with the brushes 41. From the turntable mounting construction it is apparent that the whole table may be removed from its journal by merely lifting its shaft 8 out of the base hub 4.

In order to prevent the brushes 41 from interfering with this operation, the brush support 39 is pivotally seated in the base 2; a set screw 42 being provided to fix the support in a selected position. By this arrangement the brushes 41 may be swung out of the way to clear the shaft gear 10.

Means are provided for maintaining the heating elements 16 at a substantially constant temperature. Referring particularly to Figures 4 and 5, a threaded core 43 of suitable electrical and heat insulating material is arranged to project upwardly from the central portions of the turntable 6. A resistance wire is wound about the threaded core 43 to provide a heater coil 44, and the core together with the coil is encased in a perforated shield 46. A flange 47 formed at the bottom of the core shield provides a base, and an asbestos disk 48 interposed between the flange 47 and table 6 serves as an insulating medium; the flange 47 being secured to the table by any suitable means, such as screws.

The top of the core shield 46 is formed to provide a plug 49, upon which is slidably seated a sleeve 51. A helix 52 of suitable bi-metallic strip material is disposed about the core shield 46, and is secured at its upper end to the sleeve 51 by a screw 53. The lower end of the helix 52 carries a ring 54 secured by a screw 56, and the ring is provided with a radially projecting arm 57. The normal position of the ring arm 57 depends upon the setting of the helix supporting sleeve 51; a set screw 58 being provided for fixing the sleeve at a selected position.

Figure 2:
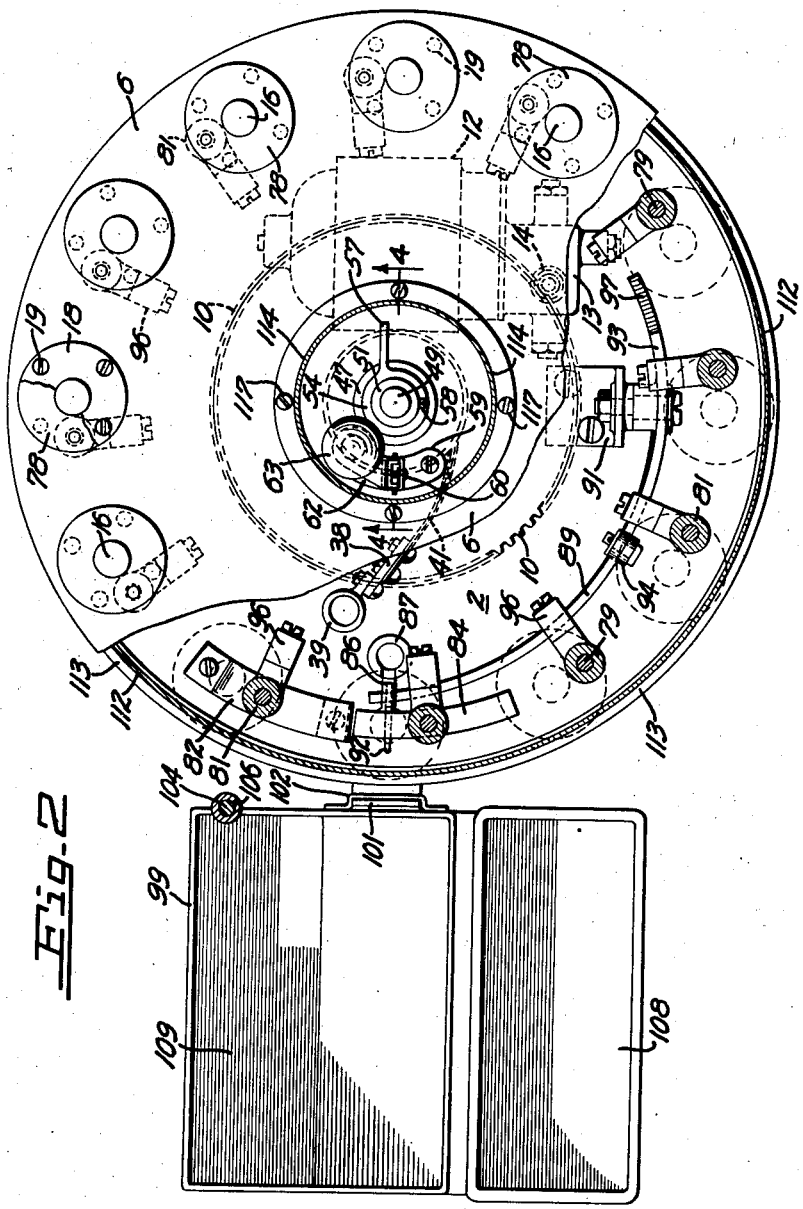
Figure 2 is a horizontal sectional view of the toaster, taken in a plane indicated by the line 2—2 of Figure 1. Portions of the turntable are broken away, and several of the heating elements are omitted to disclose the construction more clearly.

By this arrangement it is apparent that heat radiating from the coil 44 will cause an expansion of the bi-metallic strip of the helix 52 to rotate the arm 57 clockwise as viewed in Figure 2. Mounted on the table 6 in the path of movement of the arm 57 is a bracket 59 carrying a spring pressed contactor 60. This contactor is normally closed, but is arranged so that it opens when the helix arm 57 moves into registration with button 61.

A pair of metal strips 62 insulated from the bracket 59 are positioned horizontally and in spaced relation to provide a socket for a lamp 63; the upper strip being apertured to receive the thread of the lamp base. The lower socket strip extends downwardly and connects with an insulated terminal screw 64, while the upper socket strip connects with the insulated contact element 66 of the contactor 60. The movable arm of the contactor 60 is grounded to the bracket 59 which is insulated from the table 6, and a terminal screw 67 connecting with the bracket and insulated from the table 6 is provided.

The hookup for the temperature control is illustrated in Figure 6, and the arrangement of the various elements in the control is best shown in Figures 1 and 4. A lead 68 connects the contactor terminal 60 with the upper collector ring 34, and a lead 69 connects the socket terminal 66 with one end of the heater coil 44. The other end of the heater coil 44 is connected by a lead 71 to a third collector ring 72 mounted in a manner similar to the rings 34. A brush 73 adapted to bear on the ring 72 is secured to the pivotally mounted brush support 39 as were the brushes 41.

The brush 73 is connected to one end of the coil 74 of a relay 76; the other end of the relay coil 70 being connected to the supply line 22 which connects with the middle collector ring 34. The relay 76 is of conventional construction having a normally open spring pressed armature 77. This armature is interposed in the supply line 22 between the collector ring and the point where the lead from the relay coil 74 connects with the line. From this hookup it is seen that the relay coil 74, heater coil 44, lamp 63 and contactor 60 are all connected in series across the supply lines, and that as long as current flows in this control circuit the relay armature 77 is held closed to complete the circuit to the resistance units 17 of the supports or heating elements 16.

While current is flowing thru the control circuit however the heat radiating from the coil 44 is expanding the bi-metallic strip of the helix 52 to rotate the arm 57. The interval of time required to rotate this arm into engagement with the contactor button 61 is designed to bring the heating elements 16 up to the maximum temperature. At this time the contactor 60 is opened to stop the current flow thru the relay 76 and heater coil 44. Simultaneously the relay opens to cut off the current flow to the resistance units 17 of the heating elements.

Immediately the bi-metallic strip of the helix 52 starts to cool and rotate the arm 57 back towards its normal position. As soon as the arm 57 starts back the control circuit is closed and the relay 76 again actuated to complete the circuit to the resistance units 17. The cycle of operation is then repeated. As a result, the heating elements 16 are maintained at a substantially constant temperature.

Means are provided for removing the buns from the supports or heating elements 16 during a predetermined portion of the turntable movement. For this purpose a plurality of strippers are preferably provided. Referring particularly to Figures 1 and 2, the strippers preferably comprise an apertured stripper plate 78 normally resting on the flange 18 and adapted to slide up along the heating element 16. This relative movement between the stripper plate and heating element operates to push the bun off over the top of the element.

Means are provided for actuating the stripping means. A depending rod 79 projects from the stripper plate 78 and passes thru a suitable aperture cut in the table 6 and downwardly projecting boss 81. Secured on the base 2 adjacent the point at which the stripper is to be actuated is an arcuate incline 82, up which the stripper rod 79 is adapted to ride as the turntable 6 rotates about its pivot. This provides a positive means for "breaking" the bun from its toasting position and starting it off the heating element.

In order to facilitate the rod in its climb up the incline the lower end of the rod is provided with a bevel face 83. After leaving the incline 82 the stripper rod 79 rides upon an arcuate platform 84. This platform has an arm 86 adapted to slide up and down in a vertically positioned guide 87; the guide being seated in the base 2 and held by a screw 88.

An arcuate lever 89, pivoted on a base fixed standard 91, projects under the platform 84 and is confined by a lip 92 formed on the platform, so that as the lever moves up and down the platform is carried with it. Movement of the lever is controlled by an arcuate cam arm 93, also pivoted on the standard 91. A link 94 connects one end of the cam arm with the lever 89. The cam arm is depressed at periodic intervals by the action of the rollers 96 mounted on the bosses 81.

The arrangement of the actuating mechanism is such that the cam arm 93 is depressed to elevate the platform 84 while it is carrying the stripper rod 79. As a result, the stripper plate 78 is raised to strip the bun from the heating element 16. In order to prevent the stripper mechanism from dropping to its normal position, the following edge 97 of the cam face is tapered off to lower the mechanism without undue impact. Should the linkage become stuck while the cam is in the depressed position, a roller 96 will first strike the leading edge 98 of the cam face to lower the linkage to its normal position.

Means are provided for discharging the buns into a receiver as they are stripped from the heating elements 16. The receiver comprises a hopper 99 arranged adjacent the turntable 6 at the point where the stripper plate 78 pushes a bun off its support 16. A lug 101 on the base 2 is adapted to engage a holder 102 on the hopper 99 to removably hold the bun receiver adjacent the toasting mechanism. A baffle plate 103 is mounted on the hopper 99 and is positioned above the path of movement of the supports 16 to direct the buns for discharge into the hopper. The baffle plate is supported by a rod 104 slidable in a tube 106 fixed to the rim of the hopper. A set screw 107 serves to secure the baffle plate 103 in a selected position.

By this arrangement a bun being removed from a support 16 strikes the baffle plate 103 and is tipped outwardly toward the hopper 99 as it is stripped from the support. As the supports 16 pass in succession under the baffle plate 103 the toasted buns are automatically discharged into the hopper. A trough 108 opening into the lower portions of a hopper 99 provides a convenient means for giving access to the toasted buns, and a portion 109 of the hopper bottom slopes upwardly to direct the buns toward the trough 108. The hopper wall above the trough is preferably provided with a transparent pane 111 for viewing the interior of the hopper.

A cylindrical apron 112 is preferably secured adjacent the periphery of the turntable 6 for enclosing the mechanism. The lower edge of the apron is provided with a ring or bead 113 surrounding the base 2. This construction permits the apron 112 to rotate with the turntable 6, and when the table is lifted from its mounting the apron is also removed to expose the mechanism for adjustment or repair. A suitable housing 114 having a plurality of apertures 116 is preferably provided for incasing the exposed units of the temperature control means. This housing is secured to the table 6 by suitable means, such as the screws 117.

Operation

Considering that the motor 12 is running and that current is being supplied to the lines 22, the turntable 6 revolves slowly about its pivot 60 carrying the heated supports or elements 16 in a predetermined path. An operator places an object, such as a recessed bun, on each of the heating elements 16 as the elements pass from under the baffle plate 103 and the stripper plates 78 drop back to their normal position. The time required to carry the buns about the predetermined path, viz. the R. P. M. of the turntable 6, and the temperature of the heating elements 16 are adjusted to properly toast the buns prior to their removal.

The time element is taken care of by the speed reduction from the motor 12 to the turntable 6. In connection with the drive means it might be mentioned that the motor 12 may conveniently be a variable speed motor. In this event the rotation of turntable, and consequently the time which the buns are subjected to the heat of the elements 16, may readily be varied. The operation of the temperature control means has already been described in detail and will not be repeated, suffice to say that the temperature of the heating elements 16 is maintained at a selected and substantially constant temperature; it being understood that the temperature at which the elements are maintained may be adjusted by merely releasing the set screw 58 and varying the normal position of the helix arm 57.

As the supports or heating elements 16 pass in succession past the hopper 99 of the bun receiver and under the baffle plate 103 the rollers 96 ride over and depress the cam arm 93 to elevate the stripper plates 78; the stripper rods 79 first riding up the rigid inclines 82 to "break" the buns from their toasting position to allow ready stripping of the buns by the action of the stripper plates 78. The baffle plate 103 operates to discharge the toasted buns into the hopper 99 as they are successively stripped from the heating elements 16.

In conclusion it is pointed out that the toaster embodying my invention is a labor saving device, in that an operator merely has to place the raw buns on the heating elements 16. The toasting of the buns is entirely automatic, and when completed the toasted buns are finally deposited in the trough 108 from which they may conveniently be removed for serving. An added feature of the toaster lies in its novel operation, and the rotating table together with the periodic action of strippers and the intermittent flashing of the temperature control lamp serves to attract the attention of prospective patrons.

I claim:

1. A toaster comprising a turntable, means for rotating the table, a plurality of elongated heating elements mounted on the table, a stripper slidable along each of said elements, a cam mounted adjacent said table, a cam follower mounted on the table adjacent each of said elements for riding on said cam during selected portions of the table movement, and means connected with said cam for actuating the strippers of successive elements as the followers ride in succession over the cam.

2. A toaster comprising a base, a turntable mounted on the base, a plurality of elongated heating elements projecting upwardly from said table, a depending rod slidably mounted on the table adjacent each element, stripper plates on the upper ends of said rods and adapted for movement along said elements, an inclined plane on the base in the path of movement of said rods and over which the latter may ride, and means for rotating the table to move the depending rods in succession over said plane.

3. A toaster comprising a base, a turntable mounted on the base, a plurality of elongated heating elements projecting upwardly from said table, a depending rod slidably mounted on the table adjacent each element, stripper plates on the upper ends of said rods and adapted for movement along said elements, a cam arm pivotally mounted on the base, a vertically movable plate mounted on the base in the path of movement of said rods and upon which the latter may ride, means connecting the plate for movement with said arm, means for rotating the table to move the rods in succession over said plate, and a plurality of cam followers mounted on the table and positioned to ride in succession over the cam arm to depress the latter and elevate the plate while a rod is passing thereover.

4. A toaster comprising a base, a turntable mounted on the base, a plurality of heating elements spaced about the peripheral portions of the table, a perforated casing positioned centrally of the table and projecting upwardly therefrom, a thermostat arranged in the casing and operatively connected with said heating elements for controlling the temperature thereof, a lamp in the casing and visible through the perforations thereof, means actuated by the thermostat for controlling the lighting of said lamp, and means for rotating the table.

JOHN R. SKOVERSKI.